Patented May 2, 1939

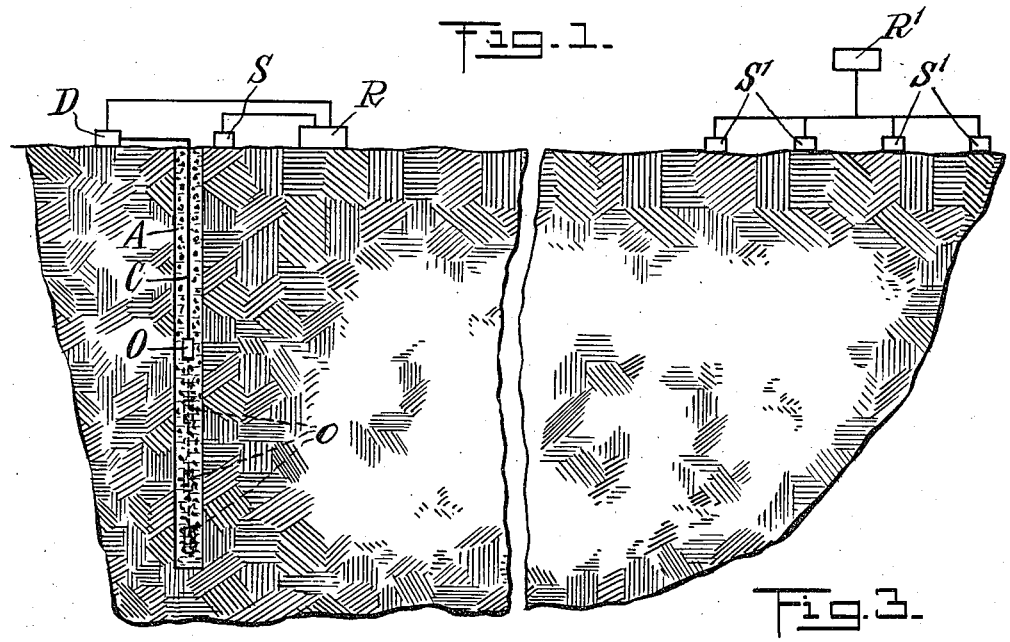
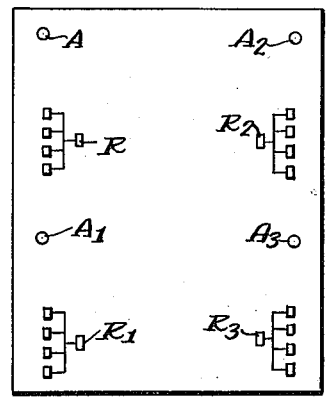
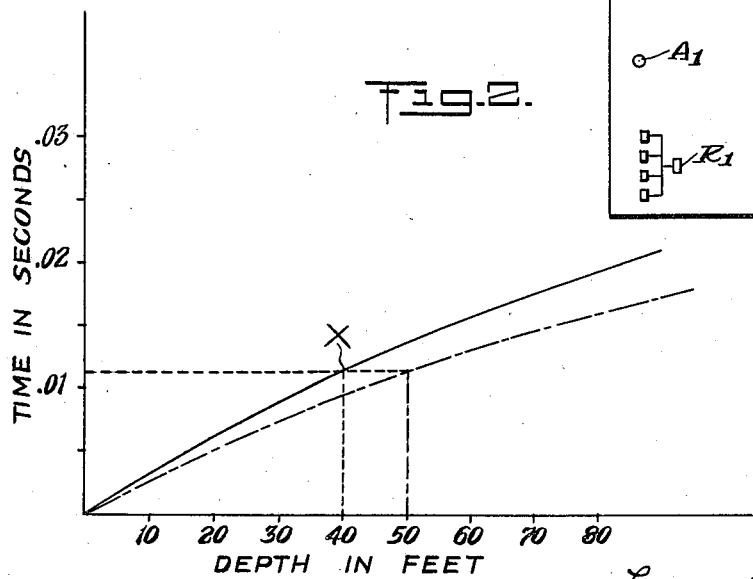

2,156,624

UNITED STATES PATENT OFFICE 2,156,624

SUBSURFACE SEISMIC SURVEYING

Lawrence Y. Faust, Tulsa, Okla., assignor to Geophysical Research Corporation, New York, N. Y., a corporation of New Jersey Application January 18, 1938, Serial No. 185,495

1 Claim. (Cl. 181—0.5)

This invention relates to sub-surface seismic surveying and is particularly applicable in the art of making reflection seismic surveys by the correlation method. The basis of this method is the similarity in appearance of records of reflections obtained from a given sub-surface stratigraphic horizon extending over a considerable area. To obtain such reflection records, explosive charges are detonated in a plurality of bore holes distributed over the area and reflected waves are received at recording stations associated with the bore holes, there being a receiving station individual to each bore hole. Because of above referred-to similarity of records, it is possible to calculate the variation in depth of the reflecting horizon over considerable areas by first correlating the reflection records at different points in the area under investigation, that is, by identifying corresponding phases of the same reflection on each record, and then calculating the depth to the reflecting horizon at each point. These calculations are based upon the time intervals between the detonation of the seismic charge and the arrival at several spaced receiving stations of the same phase of the corresponding reflections as indicated by the several records. Obviously, this method cannot be used if the appearance or character of the record of the reflection coming from the sub-surface horizon being mapped changes radically from one recording position to another. If the changes are so great that it becomes impossible to correlate the records, i. e., to identify corresponding phases of the reflections on the several records, then the variation in the depth to the reflecting horizon cannot be accurately followed.

I have found that a serious cause of character variation in reflections coming from a given sub-surface horizon is directly connected with the nature of the impulse generated at the shot position by the detonation of the seismic charge and that some areas are characterized by a surface layer of such nature that an explosive charge detonated at some depth or depths in a bore hole produces a seismic record which is not correlatable with records obtained by detonation of charges in other similar bore holes in that area. I have further found that variations in reflection character may occur at different points in an area under investigation even though the seismic charges be planted at approximately the same depth at each shot position. At times it therefore becomes difficult to distinguish between those changes in character actually caused by changes in sub-surface structure and those erratic changes caused by variations in the impulses generated at the shot point.

An object of this invention is to minimize the possibility of miscorrelating reflection records.

According to this invention, the seismic charge in each shot hole is planted at a depth such that the travel time of a seismic wave over the vertical distance between the point at which the shot is planted and the surface of the earth remains substantially constant for all shot holes used in the area. I have found that with such arrangement, the variation in the impulses generated at the various shot points in an area is materially minimized.

When starting work in a new area, a test shot hole is dug to a depth somewhat greater than the lowest depth at which it is expected to fire a shot. A velocity survey of this shot hole is then made by detonating small charges of explosive at various depths in the shot hole and measuring the travel time of the seismic waves thus generated, from each depth vertically to the surface. This is done in the manner well known to those skilled in the art by placing a detector on the earth's surface at the mouth of the shot hole and recording the waves received by means of the usual oscillograph equipped with a timing device. Means are provided to record also the instant of detonation of the shot. From the data thus obtained, a travel time-depth curve is drawn. Next, a series of seismic reflection records are made, each record being made with the detector planted at the same recording position, but with the seismic charge planted at different depths in the test shot hole. From these records, is determined the depth at which the shot gives the best quality results. The travel time corresponding to this depth is determined from the graph previously referred to. Similar time-depth graphs are made of each shot hole to be used in surveying the area, the graphs, of course, being made before the shot holes are used. From each of these graphs is determined the depth corresponding to the vertical travel time which gave best quality results in the shot hole. The seismic charge is then planted at the depth so determined and the reflection record made in the usual way.

Other objects, novel features and advantages of this invention will become apparent from the following specification and accompanying drawing, wherein:

Fig. 1 illustrates the apparatus used in the practice of the invention and the arrangement thereof with respect to a shot hole, Fig. 2 is a graph illustrating the time-depth records of the test shot hole and another shot hole, and Fig. 3 diagrammatically illustrates the area under survey.

In Fig. 1, A represents a hole drilled in the earth to any desired depth while S represents a seismometer arranged on the earth's surface at the mouth of the hole. The seismometer is suitably connected to a recorder R which is designed to produce a trace of the waves received by the seismometer. A detonator is represented by D and is connected through a suitable cable C with a charge O. Also, the detonator D is connected with the recorder R in such manner that when the charge O is exploded the instant of detonation is recorded on the trace produced by the recorder of the seismic waves received by the seismometer S. The charges used in obtaining the time depth data are very small, one blasting cap ordinarily being sufficient. The survey can, therefore, be made without serious damage to the hole which preferably is full of mud or water while the data is being obtained. A number of charges O are detonated at different depths as indicated in Fig. 1 and from the data thus obtained a time-depth graph is charted.

In Fig. 2 is illustrated in full line the time-depth graph for the test shot hole and in dotted line the time-depth graph for another shot hole. The point X on the full line graph marks the depth and time at which the optimum reflected wave record was obtained in the test shot hole. In this particular instance, the depth was forty feet and the corresponding time is, therefore, .011 second. On the broken line graph, the time of .011 second corresponds to a depth of fifty feet in the second shot hole. The seismic charge to be used in the second shot hole is, therefore, placed at the depth of fifty feet.

The depth at which good quality reflection wave results are obtained is determined in the following well-known manner. Seismometers S' are arranged at suitable distances differently spaced from the shot hole and normal size explosive charges are detonated in the hole A at various depths. A recorder R' is associated with the seismometers S' and produces a trace of the reflected waves received by each seismometer S' for each explosive charge. From an inspection of such traces, the depth at which an explosion gives good quality reflection wave records is determined.

In Fig. 3 is illustrated the usual arrangement of shot positions and recording positions followed in the correlation method of seismic surveying. In this figure, the test hole is indicated by the reference character A and the recording position associated therewith is indicated by the reference character R', there being a plurality of seismometers at such recording position as well as at the recording positions hereafter referred to. The remaining shot holes illustrated in Fig. 3 are designated by the reference characters $A_1$, $A_2$ and $A_3$ respectively, while the associated recording positions are designated $R_1'$, $R_2'$ and $R_3'$ respectively. After a determination has been made of the vertical travel time corresponding to a shot in the test hole resulting in a correlatable reflection record, seismic charges are planted in the remaining holes at depths having the same vertical travel time and are detonated in the usual manner. From such shots are obtained correlatable reflection records and correlation thereof is effected in the usual manner.

The procedure of making reflection records of the seismic waves produced by the explosion in the various shot holes at the selected depths is the same as that heretofore practiced in seismic surveying by the use of reflected waves. Traces are made of such reflected waves by the use of seismometers and recorders in the usual manner and from such traces a determination is made of the sub-surface reflection horizon.

The theoretical basis for the success of this method is not entirely clear, its value having been empirically determined. The probable reason for its success lies in the fact that the earth-air contact at the earth's surface is an almost perfect reflecting plane for seismic waves. The pulse traveling downward from the shot point, therefore, may be considered to be the resultant of two separate impulses, one coming direct from the point of detonation and the other being the pulse reflected from the surface. The time interval between these pulses will be twice the vertical travel time from the point of detonation to the surface. Any variation in this time should affect the shape of the resultant combination of pulses. By the method above described, this time interval is held constant and the shape of the combined direct and reflected pulse should also remain constant.

In many cases it has been found that the depth of charge and corresponding vertical shot hole travel time necessary to give the most usable record of a reflection coming from a given sub-surface horizon may not be the same as the shot depth for other reflections coming from greater or lesser depths. For example, a reflection record may show one reflection arriving at a time of one second after the instant of detonation and another arriving at 1.5 seconds. The shot depth required to give the most usable record of the earlier reflection may prove to be 40 feet, while the best depth for the later reflection may be 60 feet. In such cases, the method of this invention would be applied to each individual reflection, and in surveying the area, several records would be made from each shot point with the charges planted at two or more depths.

Various modifications may be made in practicing this invention without departing from its spirit as defined in the appended claim. For example, the time-depth survey of the test shot hole may be made simultaneously with the test reflection shots. This is done by first making a trial reflection shot with the charge planted at the bottom of the hole, and succeeding trial shots with the charge at progressively shallower depths. The vertical shot hole travel time for each shot is simultaneously determined in the manner previously described. Furthermore, in some areas, it is not necessary to make a complete survey of the test shot hole. The first depth tried may yield a satisfactory record in which case only the travel time to this one depth need be determined.

It will be apparent to those skilled in the art that the method of this invention is particularly well adapted to use in areas where extremely accurate results are required and where therefore it is necessary to eliminate all possible chances of mis-correlating the reflection records. In particular the method of the present invention is extremely valuable as an adjunct to the method of continuous profiling described in United States Patent No. 2,024,921 issued to W. G. Green.

I claim:

In the method of seismic surveying by correlation of reflection records produced by detonation of explosive charges in bore holes in an area characterized by a surface layer of such nature that a charge detonated at some depth or depths in the bore hole produces a seismic record which is not correlatable with records obtained by detonating charges in other similar bore holes in that area, the procedure which consists in making a time-depth graph of the material traversed by a test shot hole, determining the depth in said test shot hole at which an explosive charge produces a high quality reflection wave record, establishing the corresponding point on said test hole time-depth graph, making a time depth graph of a second shot hole, selecting the point on said second shot hole time-depth graph having the same travel time as said point on said test hole time-depth graph, detonating an explosive charge in said second shot hole at the depth corresponding to said point on said second shot hole time-depth graph and making a reflection record of the seismic waves thus produced.

LAWRENCE Y. FAUST.